Feb. 11, 1964  T. O. MATHUES  3,121,133
METHOD OF MANUFACTURING SQUEEGEES
Filed Jan. 16, 1961
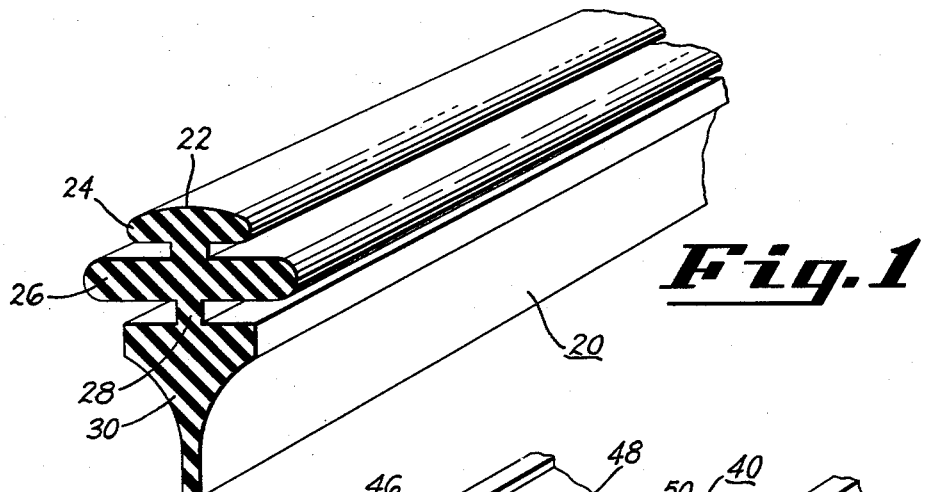
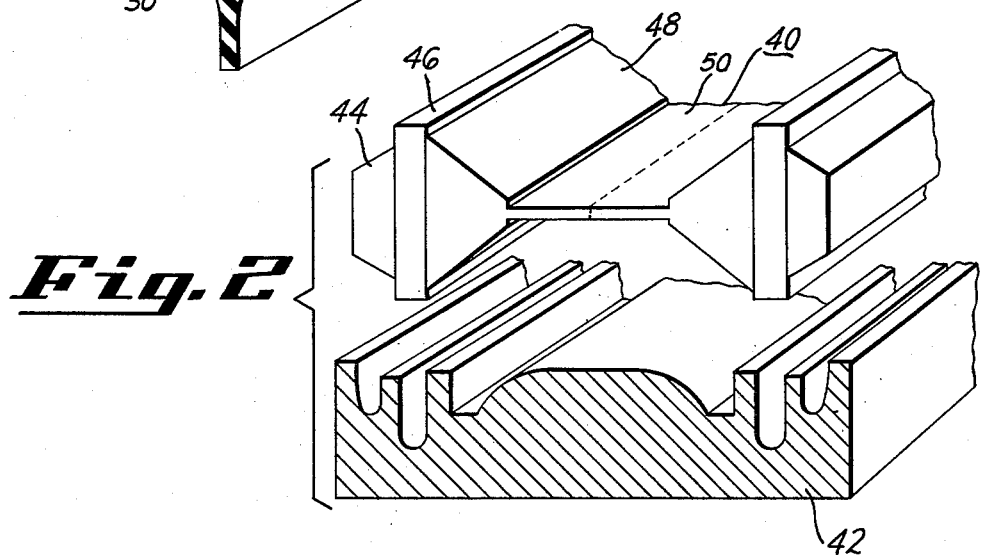
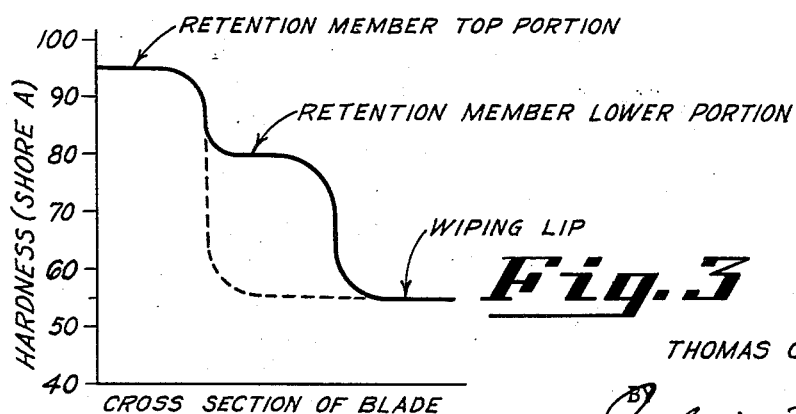
INVENTOR.
THOMAS O. MATHUES
HIS ATTORNEY

United States Patent Office 3,121,133
Patented Feb. 11, 1964

3,121,133
METHOD OF MANUFACTURING SQUEEGEES
Thomas O. Mathues, Dayton, Ohio, assignor to General Motors Corporation, Detroit, Mich., a corporation of Delaware
Filed Jan. 16, 1961, Ser. No. 83,007
5 Claims. (Cl. 264—241)

This invention relates to squeegees and is particularly concerned with a method for making squeegees for use with windshield wipers.

The main object of the invention is to provide a method for making a squeegee which includes a plurality of strata of different hardness elastomers whereby the completed squeegee includes an integral retention portion together with a flexible wiping portion.

In carrying out the above object it is a further object of the invention to provide a method for making a windshield wiper squeegee wherein a plurality of strips of uncured elastomeric material are provided each being capable upon curing of resulting in a different hardness elastomer whereby, when said strips are integrated during the molding and curing steps, an integral laminated blade or squeegee is formed having a relatively hard retention portion and a relatively resilient wiping portion.

A still further object of the invention is to provide a method for making an integral squeegee of elastomeric material wherein the relative hardness of the material from the retention portion to the wiping lip thereof is progressively softer and wherein the strata making up the several portions of the squeegee are merged one into the other without definite lines of demarkation or identity.

Further objects and advantages of the present invention will be apparent from the following description, reference being had to the accompanying drawings wherein preferred embodiments of the present invention are clearly shown.

In the drawings:

FIG. 1 is a view in perspective showing a portion of one type of windshield wiper squeegee.

FIG. 2 depicts a laid-up section of elastomeric material about to be positioned in the lower part of a compression mold.

FIG. 3 is a chart showing the relative hardness of the elastomeric material in a finished squeegee through the cross section of the blade wherein the solid line is directed to a blade having three strata of material whereas the dotted line is directed to a blade having only two strata of material.

In copending application Serial No. 83,005, filed January 16, 1961, now Patent No. 3,116,506, in the names of Clyde A. Browne and Elmer E. Reese, assigned to the assignee of the present invention and filed concurrently herewith, a windshield wiper blade or squeegee is described which includes an integral elastomeric portion having two or more strata of different hardness elastomers making up the structure. In this blade the retention portion of the squeegee is relatively hard when compared to the wiping or lip portion thereof. The present invention is directed specifically to a method for making blades of this general character since it is quite apparent that numerous problems will occur in obtaining the desired variations in hardness over the cross section of an elastomeric squeegee.

Referring to the drawings, FIG. 1 indicates a squeegee at 20 having a retention portion 22 which includes an upper flange 24 and a lower flange 26. A neck 28 connects the retention portion 22 with the blade or lip portion 30 which tapers outwardly to a very thin and flexible wiping lip.

In accordance with the aforementioned Browne and Reese invention, it is desired to have the retention portion 22 in whole or in part, formed from a harder elastomeric material than is used in the blade portion 30 thereof. Furthermore, it is sometimes desirable to have varying degrees of hardness in varying strata running longitudinally of the squeegee. For this reason, and for purposes of illustration only, the parts 24, 26 and 30 will be formed from stratum of different hardness although it is to be understood that the entire retention portion 22 may be made from one hardness material while the blade portion may be made of another.

It is well known in the art, when elastomeric materials, such as rubber-like materials, are compression molded that it is necessary to load the mold with a predetermined quantity of moldable material. This is generally determined by weight so that very little excess is present. This slight excess generally takes the form of flash, or sprues which is removed from the finished product. It is necessary that a slight excess be used in order to insure complete filling of the mold whereby a faithful representation of the part may be molded.

In the present instance it is highly desirable to mold two blades simultaneously and to later cut the blades apart at the thinnest portion thereof whereby a precision wiper edge is obtained. The various rubber stocks used in the several portions of the blade are compounded in such a manner as to yield the desired hardness in the various strata of the cured material. These specific stocks are next extruded in blank form wherein the blank approximates in shape the specific contour desired in the mold. Desired lengths of the blanks are cut so that the proper weight of material is provided. The cut lengths of blanks being uncured are somewhat tacky and may be adhered together by slight pressure to form a laid-up slug or charge which may be placed in one section of the mold. Such an assembly is shown in FIG. 2, wherein a slug, or charge, 40 of rubber-like material is shown as it is being placed in a mold section 42. The section 44 of the charge 40 will ultimately become the molded portion 24 of the squeegee 20. The part 46 will ultimately become the part 26 of the retaining portion 22 whereas the parts 48 and 50 will ultimately become the flexible wiping lip 30 of the blade as shown at 20. The opposite side of the charge has identical parts to those already described.

Each of these strips 44, 46 and 48 may be extruded from different compounds which are capable of curing under identical time conditions whereby when the charge 40 is placed in the mold 42 and the upper half, not shown, is forced thereon and so that the charge 40 will be compressed to completely fill the mold and present a faithful reproduction thereof while the various lamina or sections become homogeneous strata of the cured unitary blade.

FIG. 3 indicates in solid lines a curve indicating the relative hardness of various portions of the squeegee taken through the cross section thereof. In this instance, and for illustration purposes only, the top of the retention portion as indicated at 24 in FIG. 1 will have a hardness of about 95 (Shore A). The lower portion of the retention member as indicated at 26 in FIG. 1 will have a hardness in the order of 80 (Shore A). The wiping lip or flexible portion 30 will have a hardness of about 60 (Shore A). In this connection it is apparent that the relative hardness of the various stratum of the blade may vary considerably in accordance with the design of the squeegee which, in turn, will vary in accordance with the design or contour of the windshield with which it is to be used. In other words, a heavily contoured windshield generally requires greater hardness in the retention portion of the squeegee than a relatively flat windshield. These factors are best determined by trial.

Again referring to FIG. 3, if only two hardness elastomers are used in the squeegee 20 the cross section will follow the dotted line curve of FIG. 3 wherein the retention portion will again be in the order of 95 (Shore A) hardness while the blade portion will drop down to 50 to 60 (Shore A) hardness. In this connection, since the blade portion 30 is connected to the retention portion 22 by means of the neck 28 it is apparent that there will be a section within the neck 28 of varying hardness where the two stratum merge together. This merging, which will occur whenever stratum of different formulations are adjacent one another, is caused by interdiffusion of the components of the recipe together with a mechanical intermingling of the materials due to the compression molding step.

In place of extruding the various sections of the laid-up charge it is possible to sheet the several materials on a mill wherein the sheets are milled to the desired thickness and then, by means of a blade, are cut into strips of the desired widths. The width of these strips is predetermined by trial so that when the various strips may be laid up into a charge and compression molded that sufficient material will be present to completely fill the mold and faithfully reproduce the contours thereof on the molded object.

Specific formulations which may be used will vary widely as is well known in the art. A great majority of windshield wiper squeegees used today are made from high grade crepe rubber although it is within the scope of this invention to utilize such elastomers as butadiene-styrene copolymers, butadiene-acrylonitrile copolymers, butadiene-acrylonitrile-phenolics, polychloroprene, butyl rubber, etc.

Specific examples of recipes which may be cured under similar time conditions and which will utimately result in rubbers having specific hardness as indicated are as follows:

*Example I.—Shore A 60 Hardness*

|  | Pts. by wt. |
|---|---|
| Natural rubber (pale crepe) | 100.0 |
| Mercaptobenzothiazole disulfide | 1.0 |
| Tetramethylthiuram disulfide | 0.15 |
| Sulfur | 2.75 |
| Sym. dibeta-naphthyl-paraphenylene diamine | 1.0 |
| Zinc oxide | 10.0 |
| Stearic acid | 0.75 |
| U.O.P. 288 (N,N'di 2 octyl-p-phenylene diamine | 1.0 |
| Carbon black (medium thermal) | 50.0 |
| Oil | 3.0 |

Cure time—10 min. @ 300° F.

*Example II.—Shore A 80 Hardness*

|  | Pts. by wt. |
|---|---|
| Same as Example I except for carbon black which should be E.P.C. (easy processing) | 75.0 |

Same cure time and temperature.

*Example III.—Shore A 95 Hardness*

| Rubber: | | Pts. by wt. |
|---|---|---|
| Natural rubber (pale crepe) | 80 pts. | |
| Butadiene styrene copolymer | 20 pts. | 100.0 |
| High styrene, "Pliolite" S-6 | | |
| High abrasion carbon black | | 80.0 |
| Zinc oxide | | 10.0 |
| Stearic acid | | 0.75 |
| Sulfur | | 3.0 |
| Light process oil | | 1.0 |
| Sym. dibeta-naphthyl-para-phenylene diamine | | 1.0 |
| N cyclo hexyl 2 benzothiazole sulphenamide | | 0.5 |

Cure time—10 min. @ 300° F.

In the above recipes various other materials may be substituted in the compound as is well known in the art.

Further, it is apparent that the hardness thereof will vary in most instances as the quantity of carbon black and vulcanizing agent(s) vary, the more carbon black, the harder the material, etc.

It is also apparent that in place of using rubber-like compounds which will cure under identical time conditions that it is possible and often desirable to utilize compounds which do not cure under identical conditions.

In this connection it is highly desirable in some instances to utilize a rubber-like material in the harder portion of the squeegee which requires a longer cure than the material used in the softer or blade section thereof. This may be explained as follows:

In certain instances when compression molding operations are being carried out there is a tendency for the materials to intermingle excessively where complicated cross sections are being made and in these instances, therefore, it is highly desirable that the harder material or retention portion be partially cured before it is finally molded with the blade portion. In this case the partial cure should not be so long as to destroy the mobility of the material whereby after the partially cured part is molded in the mold, together with an uncured portion of the blade, the cure is continued. In this case, the cure time for the uncured material will be equal to the remainder of the curing period for the partially cured part. In this manner, the two parts may be molded together and due to the degree of mobility remaining in the partially cured part, a homogeneous blade will be obtained including two or more stratum of different hardness rubbers, as the case may be. It is apparent in this instance that co-mingling of the materials at their interface is lessened to a degree although, again, there will be an area at the interface where a degree of co-mingling is present to form a homogeneous blade. Longer cure times may be obtained by changing the quantity of accelerator and/or curing agent used, such variations being well known in the art.

It is also understood that where extrusion techniques are used to form a slug or charge of material that the extrusion may be formed to substantially the exact shape of the part to be molded but in each instance it is desirable that the overall cross section of the part be slightly larger, in the order of some 1% to 2% by weight of the finished part, so that pressure will be obtained during the molding operation to completely fill the mold and force the several lamina into intimate relation to one another at their interfaces for facilitating the integration of the stratafied structure.

In addition to the formulations set forth in Examples I, II and III, attention is directed to the Vanderbilt Rubber Handbook published in 1948 by the R. T. Vanderbilt Company, pages 194 and 195 thereof, where various rubber compounds are set forth having different degrees of hardness together with the conditions under which the cures are carried out. Also, on pages 200 and 201, butadiene-styrene formulations are set forth for varying hardness rubbers whereas on pages 204 and 205 blends of natural rubber and butadiene-styrene material having varying degrees of hardness are set forth.

While the embodiments of the present invention as herein disclosed, constitute preferred forms, it is to be understood that other forms might be adopted.

What is claimed is as follows:

1. In a method for making a vehicle windshield wiper squeegee comprising a flexible, unitary, elongate body of solid elastomeric material having a longitudinally extending wiping portion and a longitudinally extending retention portion and having longitudinally extending strata of different hardness, said wiping portion being formed at least in part by a soft stratum and said retention portion being formed at least in part by a hard stratum, the steps comprising; compounding a relatively hard curable elastomer, compounding a second and relatively softer curable elastomer, forming predetermined quantities of each of said compounded elastomers into elongate bodies of the approximate cross sectional shapes ultimately desired in the retention and wiping portions respectively and each including the desired weight of the specific compound required, positioning said formed elongate bodies in assembled juxtaposed linear relation within a mold, compression molding and curing the assembly of said bodies within said mold for causing a merging of the compounds at their longitudinal interface therebetween to form an integral stratafied linear windshield wiper squeegee having a retention portion comprising a relatively hard stratum and wiping portion comprising a relatively softer and more flexible stratum joined longitudinally by a stratum of intermediate hardness, each of said stratum extending substantially throughout the length of the squeegee and finally cutting the wiping portion longitudinally thereof for forming a precision cut edge thereon.

2. In a method for making a vehicle windshield wiper squeegee comprising a flexible, unitary, elongate body of solid elastomeric material having a longitudinally extending wiping portion and a longitudinally extending retention portion and having longitudinally extending strata of different hardness, said wiping portion being formed at least in part by a soft stratum and said retention portion being formed at least in part by a hard stratum, the steps comprising; compounding a relatively hard curable elastomer, compounding a second and relatively softer curable elastomer, extruding elongate strips of said two compounded elastomers in the approximate cross sectional shapes ultimately desired in the retention and wiping portions respectively positioning said strips in assembled in abutting juxtaposed linear relation within a mold and finally compression molding and curing said juxtaposed strips within said mold for causing a merging of the compounds at their interface to form an integral stratafied linear windshield wiper squeegee having a retention portion comprising a relatively hard stratum and wiping portion comprising a relatively softer and more flexible stratum joined longitudinally by a stratum of intermediate hardness, each of said stratum extending substantially throughout the length of the squeegee.

3. The method claimed in claim 1 wherein the relatively harder curable compound is partially cured prior to its assembly and final cure with the softer curable elastomer.

4. The method claimed in claim 2 wherein said uncured strips are mechanically adhered in juxtaposition prior to placement within the mold.

5. The method claimed in claim 2 wherein said uncured strips are assembled in juxtaposed relation within the mold.

References Cited in the file of this patent
UNITED STATES PATENTS

| | | |
|---|---|---|
| 1,474,510 | Campbell | Nov. 20, 1923 |
| 1,475,463 | Weida | Nov. 27, 1923 |
| 1,539,618 | Willshaw | May 26, 1925 |
| 1,680,823 | Teed | Aug. 14, 1928 |
| 2,275,081 | Maynard | Mar. 3, 1942 |